United States Patent
Naiki (10) Patent No.: US 11,320,305 B2
(45) Date of Patent: May 3, 2022

(54) SELF-DIAGNOSIS METHOD FOR VIBRATION SENSOR AND VIBRATION SENSOR SYSTEM EQUIPPED WITH SELF-DIAGNOSIS FUNCTION

(71) Applicant: ROHM CO., LTD., Kyoto (JP)

(72) Inventor: Takashi Naiki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 16/987,151

(22) Filed: Aug. 6, 2020

(65) Prior Publication Data

US 2021/0041286 A1 Feb. 11, 2021

(30) Foreign Application Priority Data

Aug. 7, 2019 (JP) .............................. JP2019-145045

(51) Int. Cl.
*G01H 11/06* (2006.01)
*G01P 21/00* (2006.01)
*G01P 15/12* (2006.01)
*G01P 15/125* (2006.01)

(52) U.S. Cl.
CPC ............ *G01H 11/06* (2013.01); *G01P 15/123* (2013.01); *G01P 15/125* (2013.01); *G01P 21/00* (2013.01)

(58) Field of Classification Search
CPC ...... G01P 15/123; G01P 15/125; G01P 21/00; G01H 11/06
See application file for complete search history.

(56) References Cited

U.S. PATENT DOCUMENTS

| 5,377,523 A * | 1/1995 | Ohta ................... G01P 15/0922 73/1.38 |
| 8,914,196 B1 * | 12/2014 | Breed ................. B60R 21/0132 701/45 |
| 2003/0000308 A1 * | 1/2003 | Banno ...................... G01D 3/08 73/602 |
| 2006/0272386 A1 * | 12/2006 | Mayer-wegellin .......................... G01C 19/5776 73/1.37 |
| 2010/0057289 A1 * | 3/2010 | Hiraoka ............... B60R 21/0133 701/29.1 |
| 2010/0179722 A1 * | 7/2010 | Suetsugu ............... G01C 19/56 701/29.2 |

FOREIGN PATENT DOCUMENTS

JP 5099522 B2 12/2012

* cited by examiner

*Primary Examiner* — Helen C Kwok
(74) *Attorney, Agent, or Firm* — Rabin & Berdo, P.C.

(57) ABSTRACT

A self-diagnosis method for a vibration sensor attached to vibrating equipment includes measuring vibration data of the vibrating equipment by the vibration sensor, integrating the vibration data, and diagnosing whether or not the vibration sensor is abnormal by comparing an integrated value of the vibration data with a reference value.

4 Claims, 8 Drawing Sheets

SELF-DIAGNOSIS METHOD FOR VIBRATION SENSOR AND VIBRATION SENSOR SYSTEM EQUIPPED WITH SELF-DIAGNOSIS FUNCTION

CROSS-REFERENCE TO RELATED APPLICATION

This application is based upon and claims the benefit of priority from Japanese Patent Application No. 2019-145045, filed on Aug. 7, 2019, the entire contents of which are incorporated herein by reference.

TECHNICAL FIELD

The present disclosure relates to a self-diagnosis method for a vibration sensor and a vibration sensor system equipped with a self-diagnosis function.

BACKGROUND

Predictive maintenance of equipment may be carried out by monitoring vibrations occurring during operation of industrial equipment with a power source such as a motor. The predictive maintenance is to perform maintenance before the equipment breaks down by focusing on a difference between a vibration occurring in a normal operation of the equipment and a vibration occurring in a process leading to a failure.

The monitoring of the vibrations is periodically done for each period determined by the equipment. The reason for the periodic monitoring is because a vibration measuring machine is expensive. Therefore, it is necessary to measure, record, and evaluate vibrations for each time period depending on the equipment, which increases a burden on maintenance personnel.

As a method for reducing the burden on the maintenance personnel, a method of attaching a vibration sensor to the equipment and monitoring vibrations at all times may be considered. The recent development of sensor devices has led to the spread of inexpensive and high-performance acceleration sensors with micro electro mechanical systems (MEMS) structures.

By using such inexpensive sensors, the sensors may be installed for respective target equipment to monitor the vibrations at all times. However, most of these inexpensive sensors are designed and manufactured on the premise that they are used for consumer equipment. Consequently, high reliability cannot be confirmed in many cases considering the use in industrial equipment.

In order to enable a sensor to be installed at all times in a situation where high reliability has not been confirmed, it is effective to provide the sensor with a self-diagnosis function. Such a sensor is known as a sensor equipped with a self-diagnosis function.

However, such sensor requires application of a test signal (pseudo-acceleration signal) of a predetermined magnitude to the sensor body. Consequently, the configuration for self-diagnosis becomes complicated. Further, since the test signal is required to be input to the sensor body, it does not mean that the sensor body may be any general-purpose product. In other words, the conventional technology has a problem that the configuration is complicated and requires a test signal corresponding to each sensor specification, thereby resulting in high cost.

SUMMARY

Some embodiments of the present disclosure provide a self-diagnosis method for an inexpensive vibration sensor, which requires no test signal for self-diagnosis and can use a general-purpose sensor as it is, and a vibration sensor system equipped with a self-diagnosis function.

An aspect of the present disclosure provides a self-diagnosis method for a vibration sensor attached to vibrating equipment. The method includes: measuring vibration data of the vibrating equipment by the vibration sensor; integrating the vibration data; and diagnosing whether or not the vibration sensor is abnormal by comparing an integrated value of the vibration data with a reference value.

Another aspect of the present disclosure provides a vibration sensor system equipped with a self-diagnosis function and attached to vibrating equipment. The system includes: a vibration sensor configured to measure vibration data of the vibrating equipment; an integrator configured to integrate the vibration data; and a diagnoser configured to diagnose whether or not the vibration sensor is abnormal by comparing an integrated value of the vibration data with a reference value.

DETAILED DESCRIPTION

Embodiments of the present disclosure will now be described with reference to the drawings. In the following description of the drawings, like or similar parts are denoted by like or similar reference numerals. Further, the embodiments described below are presented to illustrate apparatuses or methods for embodying the technical concept of the present disclosure and are not intended to specify the configurations, procedures, and the like to those given below. The embodiments may be variously modified without departing the scope of the accompanying claims.

First Embodiment

Figure 1:
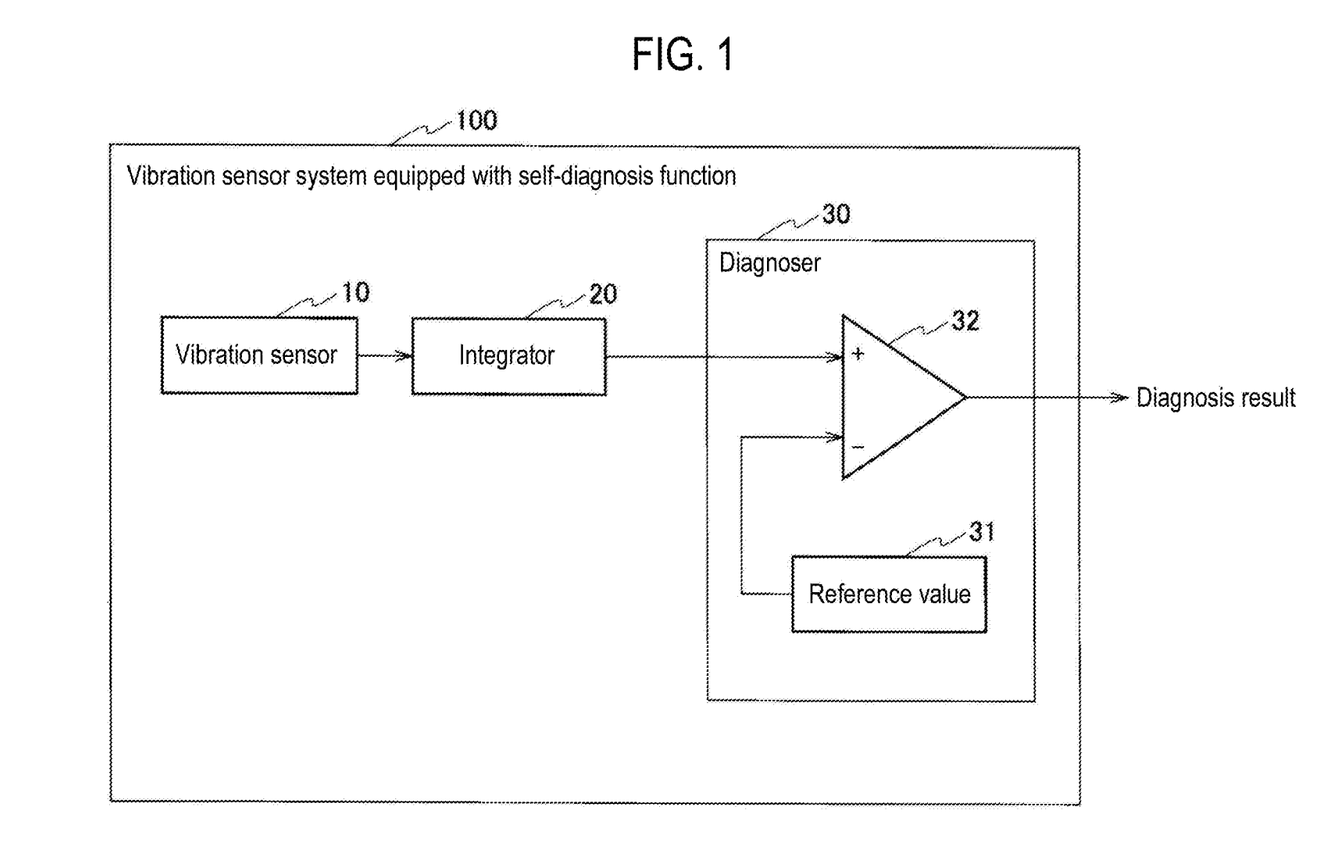
FIG. 1 is a block diagram illustrating a functional configuration example of a vibration sensor system equipped with a self-diagnosis function according to a first embodiment of the present disclosure.

FIG. 1 is a block diagram illustrating a functional configuration example of a vibration sensor system equipped with a self-diagnosis function (hereinafter, referred to as a "vibration sensor system") according to a first embodiment of the present disclosure. A vibration sensor system 100 illustrated in FIG. 1 is a vibration sensor system which is attached to industrial equipment with a power source such as a motor and has a function of monitoring vibrations of the equipment and performing self-diagnosis.

Attachment of the vibration sensor system 100 to the equipment is performed by attaching a housing (not shown) constituting the vibration sensor system 100 to the equipment with, for example, a magnet or the like. The attachment of the vibration sensor system 100 to the equipment may also be performed by rigidly fixing the vibration sensor system 100 by using, for example, a screw. The attachment may be performed by any method as long as the vibration sensor system 100 can be fixed so that vibrations of the equipment can be detected. The same applies to other embodiments described below.

The vibration sensor system 100 includes a vibration sensor 10, an integrator 20, and a diagnoser 30. Further, in FIG. 1, notation of a functional part for monitoring the vibrations of the equipment is omitted. Also, notations of general components such as a power source, a display, a controller, and the like are omitted.

Figure 2:
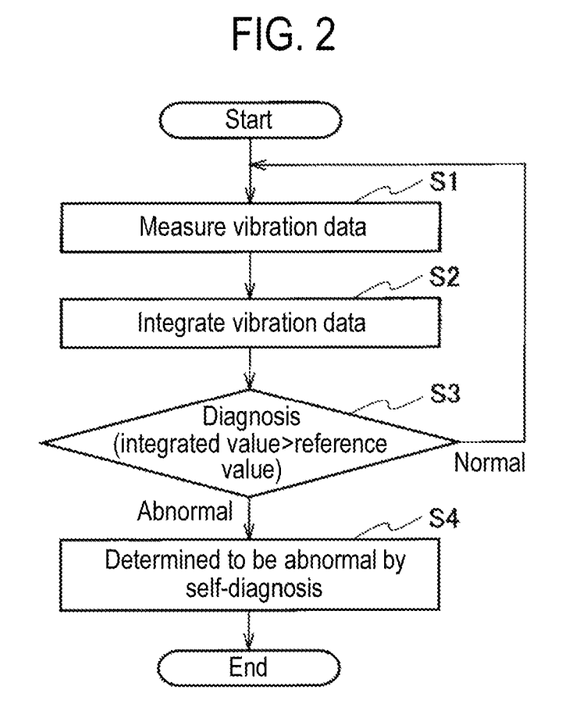
FIG. 2 is a flowchart illustrating an operation procedure of the vibration sensor system equipped with a self-diagnosis function according to the first embodiment.

FIG. 2 is a flowchart illustrating an operation procedure of the vibration sensor system 100. An operation of the vibration sensor system 100 will be described with reference to FIGS. 1 and 2.

The vibration sensor 10 is a general-purpose acceleration sensor, such as a capacitance type or a piezoresistive type of a MEMS structure. Such an acceleration sensor can also detect gravitational acceleration, in which the detected acceleration is output as an analog amount such as a voltage value.

The detection axes of these acceleration sensors generally consist of three axes. In the following description, as an example, an example of detecting acceleration in a vertical direction will be described. Further, with respect to two directions orthogonal to the vertical direction, output signals of the acceleration sensor may be processed in the same manner as in the vertical direction.

The vibration sensor 10 measures vibration data of the equipment (step S1). For example, when a vibration in the vertical direction is detected, the detection axis of the acceleration of the vibration sensor 10 is adjusted to the vertical direction.

An output of the vibration sensor 10 when the equipment is not operating is a DC voltage (constant voltage) corresponding to gravitational acceleration of 1 G. When the equipment is operating, an AC voltage corresponding to an acceleration (vibration) in a positive direction (for example, an upward direction) and a negative direction (for example, a downward direction) is output.

The integrator 20 integrates (averages) the vibration data (AC voltage) output by the vibration sensor 10 (step S2). The integrator 20 may be configured by an integration circuit formed of passive components, or may be configured by an integration circuit using an operational amplifier. Alternatively, the AC voltage output from the vibration sensor 10 may be converted into discrete data (digital value) by an AD converter, and the discrete data may be integrated (added up). An example of converting the AC voltage into the discrete data by the AD converter will be described later.

The vibration sensor 10 is a calibrated general-purpose product. Therefore, when the vibration sensor 10 is normal and the equipment is not moving, the acceleration in the + direction and the acceleration in the—direction are equal, and thus, a value obtained by integrating the vibration data becomes zero. In other words, the vibration on the spot without moving may be regarded as velocity≈0 in a certain period, and a value obtained by integrating the acceleration in that case is also zero. Furthermore, in this example, since the vertical acceleration is detected, the value becomes a value offset by 1 G of the gravitational acceleration.

In the process of leading to a failure due to deterioration of the vibration sensor 10, the value obtained by integrating the vibration data may not be zero. The diagnoser 30 detects this change.

The diagnoser 30 includes a reference value 31 and a determinator 32. The reference value 31 is, for example, a predetermined voltage. The determinator 32 is, for example, a comparator formed of an operational amplifier. The diagnoser 30 diagnoses whether or not the vibration sensor 10 is abnormal by comparing an integrated value of the vibration data with the reference value (step S3). Further, the value obtained by integrating the vibration data may be positive or negative depending on failure conditions of the vibration sensor 10. When detecting both changes, two diagnosers 30 (two systems) are prepared.

The reference value 31 is set to a value which may not be present in a normal usage environment and can be used to detect abnormal conditions. For example, the reference value is set to a value larger than a value which may be present in the specification in consideration of the temperature characteristics of the vibration sensor 10.

By setting the reference value 31 as described above, when the vibration sensor 10 is normal, the integrated value becomes smaller than the reference value 31, and thus, an output of the determinator 32 becomes zero (low voltage). On the other hand, when the vibration sensor 10 is abnormal, the integrated value becomes larger than the reference value 31, and thus, the output of the determinator 32 becomes one (high voltage). By comparing the integrated value with the predetermined reference value 31 as described above, whether or not the vibration sensor 10 is abnormal can be diagnosed.

When the vibration sensor 10 is normal, the operations of steps S1 to S3 are repeated ("Normal" loop at step S3). When the vibration sensor 10 is abnormal, self-diagnosis of abnormal is made and the operation is terminated (step S4). When the result of the self-diagnosis is determined to be abnormal, the abnormality is displayed or notified (alarm output, output of an abnormal signal, or the like). For the display, for example, an LED or the like may be turned on, or the abnormality may be displayed on a display (not shown).

As described above, the vibration sensor system 100 according to the present embodiment is a vibration sensor system attached to the vibrating equipment, and includes the vibration sensor 10 configured to measure the vibration data of the equipment, the integrator 20 configured to integrate the vibration data, and the diagnoser 30 configured to diagnose whether or not the vibration sensor 10 is abnormal by comparing the integrated value of the vibration data with the reference value.

Further, the vibration sensor system 100 provides a self-diagnosis method for the vibration sensor 10. The self-diagnosis method is a self-diagnosis method for the vibration sensor 10 attached to the vibrating equipment, and includes step S1 of measuring vibration data of the equipment by the vibration sensor 10, step S2 of integrating the vibration data, and step S3 of diagnosing whether or not the vibration sensor 10 is abnormal by comparing an integrated value of the vibration data with the reference value.

According to the present embodiment, since whether the vibration sensor 10 is normal or abnormal is diagnosed based on the vibration of the equipment, it is not necessary to apply a predetermined test signal. Therefore, since the predetermined test signal is unnecessary, a general-purpose vibration sensor can be used as it is. Accordingly, it is possible to reduce the cost of the vibration sensor system 100. In addition, since the replacement of the abnormal or deteriorated vibration sensor is prompted, it is possible to minimize the downtime of monitoring.

Second Embodiment

Figure 3:
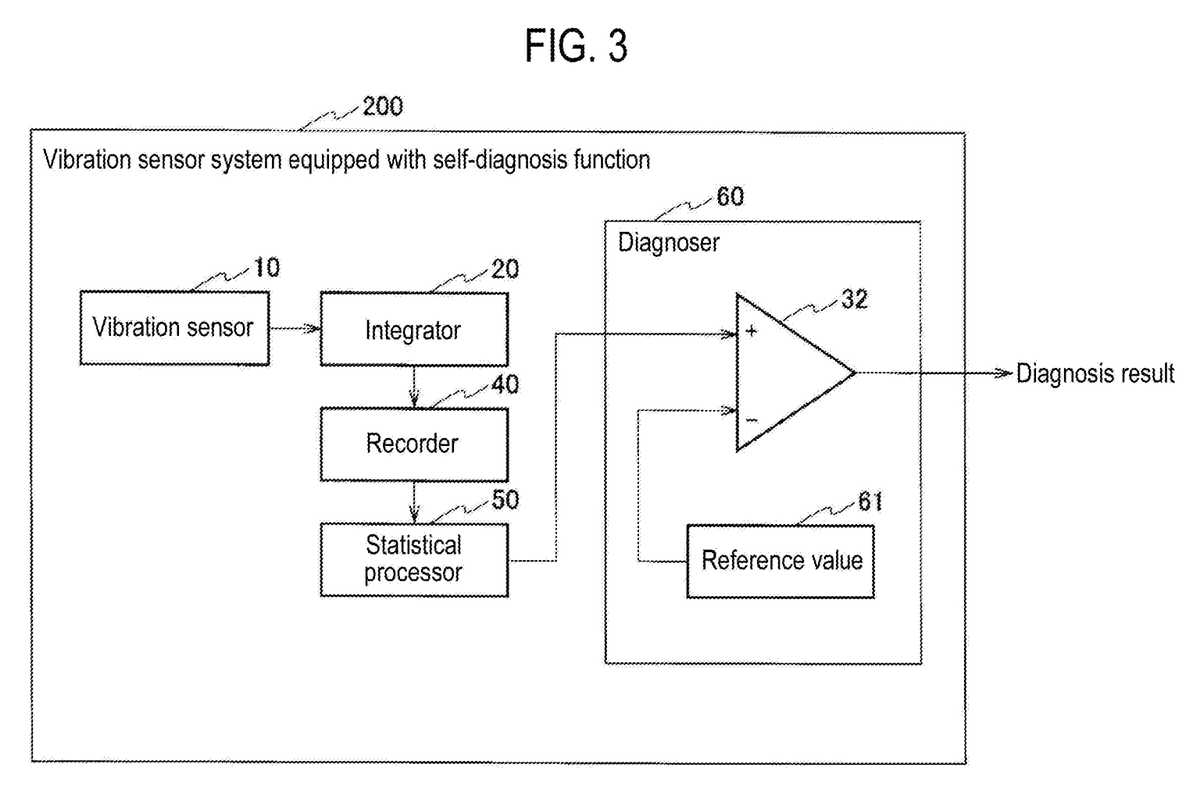
FIG. 3 is a block diagram illustrating a functional configuration example of a vibration sensor system equipped with a self-diagnosis function according to a second embodiment of the present disclosure.

FIG. 3 is a block diagram illustrating a functional configuration example of a vibration sensor system according to a second embodiment of the present disclosure. A vibration sensor system 200 illustrated in FIG. 3 is different from the vibration sensor system 100 (see FIG. 1) in that the vibration sensor system 200 includes a recorder 40 and a statistical processor 50. Further, the vibration sensor system 200 is different from the vibration sensor system 100 in that the vibration sensor system 200 includes a diagnoser 60 having a reference value 61 different from the reference value 31.

In addition, the vibration sensor system 200 is different from the vibration sensor system 100 in that the vibration sensor system 200 converts an AC voltage output from the vibration sensor 10 into discrete data by an AD converter.

The recorder 40 records the integrated value of the vibration data in each predetermined period. The statistical processor 50 statistically processes the integrated value recorded in the recorder 40. The diagnoser 60 diagnoses whether or not the vibration sensor 10 is abnormal by comparing the statistical data obtained by the statistical processor 50 with a reference value corresponding to the statistical data. The recorder 40, the statistical processor 50, and the diagnoser 60 process digital signals.

Figure 4:
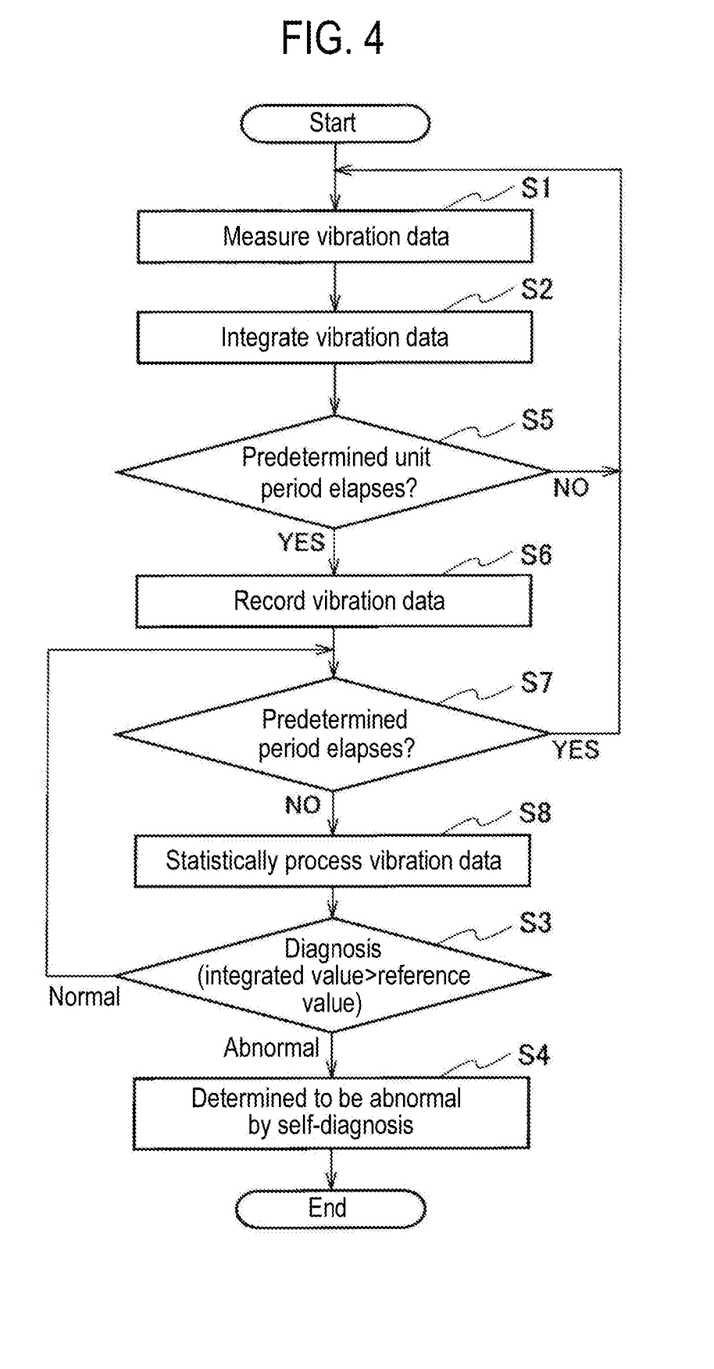
FIG. 4 is a flowchart illustrating an operation procedure of the vibration sensor system equipped with a self-diagnosis function according to the second embodiment.

FIG. 4 is a flowchart illustrating an operation procedure of the vibration sensor system 200. An operation of the vibration sensor system 200 will be described with reference to FIGS. 3 and 4.

The vibration data of the equipment measured by the vibration sensor 10 is integrated by the integrator (step S2) until a predetermined unit period elapses ("NO" at step S5). The predetermined unit period is a measurement time for integrating the vibration data once. The predetermined unit period is, for example, a time of several milliseconds to several seconds. In addition, the predetermined unit period may also be referred to as a sampling time or an integration time.

The integrated value obtained by integrating the vibration data for the predetermined unit period is recorded in the recorder 40 (step S6).

The processing of steps S1 to S6 described above is repeated each time a predetermined period elapses ("YES" at step S7). The predetermined period is, for example, a period (sampling cycle) such as one second, one minute, one hour, or half a day. The predetermined unit period and the predetermined period are set in advance by maintenance personnel. The recorder 40 repeatedly records, for example, both the integrated value and an accumulated integrated value, in each predetermined period (step S6).

As described above, the vibration data is integrated in the predetermined unit period, and is intermittently measured at intervals of the predetermined period. The vibration data may be continuously measured without setting the predetermined period. In this case, the predetermined unit period is continuous time, and the predetermined period is zero.

The statistical processor 50 statistically processes the integrated value recorded in the recorder 40 (step S8). As the statistical processing, for example, a processing for obtaining all statistical data such as an average, a variance, and a moving average of integrated values may be applied.

The diagnoser 60 diagnoses whether or not the vibration sensor 10 is abnormal by comparing the statistical data obtained by the statistical processor 50 with the reference value corresponding to the statistical data (step S3). When the statistically processed integrated value is larger than the reference value, the self-diagnosis of the vibration sensor 10 is determined to be abnormal (step S4), and the operation is terminated. When the statistically processed integrated value is smaller than the reference value, the self-diagnosis of the vibration sensor 10 is determined to be normal ("Normal" at step S3), and the processing from step S1 is repeated through "YES" at step S7.

When the statistical data is an average value, the reference value is an average value. Also, when the statistical data is a variance, the reference value is a variance. Further, when the statistical data is a moving average, the reference value is a moving average. The reference value is set in advance so as to correspond to the statistical data.

As described above, the vibration sensor system 200 according to the present embodiment includes the recorder 40 configured to record the integrated value of the vibration data in each predetermined period, and the statistical processor 50 configured to statistically process the integrated value recorded in the recorder 40. The diagnoser 60 diagnoses whether or not the vibration sensor 10 is abnormal by comparing the statistical data obtained by the statistical processor 50 with the reference value corresponding to the statistical data.

Further, the vibration sensor system 200 provides a self-diagnosis method for the vibration sensor 10. The self-diagnosis method includes step S6 of recording the integrated value of the vibration data in each predetermined period, and step S8 of statistically processing the integrated value recorded at step S6. In the diagnosing step of step S3, whether or not the vibration sensor 10 is abnormal is diagnosed by comparing the statistical data obtained in the statistical processing with the reference value corresponding to the statistical data.

According to the present embodiment, the effect of stabilizing the diagnosis can be achieved, in addition to the effects that can be achieved in the first embodiment. That is, since the abnormality of the equipment is diagnosed based on the statistical data obtained by statistically processing a plurality of integrated values, it is possible to improve the accuracy of the diagnosis. In other words, it is possible to remove the influence of noise or the like even by a simple statistical processing such as averaging. In some embodiments, the noise may be appropriately removed by a filter or the like in the vibration sensor 10 or in the integrator 20.

Furthermore, the recorder 40, the statistical processor 50, and a controller (not shown) according to the present embodiment can be easily realized by, for example, a one-chip microcomputer or the like. In this case, the statistical processing executed by the statistical processor 50 is described by embedded software representing the processing procedure of a microprocessor constituting the microcomputer. The embedded software is stored in a read-only memory (ROM) constituting the microcomputer. As described above, the vibration sensor system 200 has a configuration suitable for being implemented in an embedded system.

Third Embodiment

Figure 5:
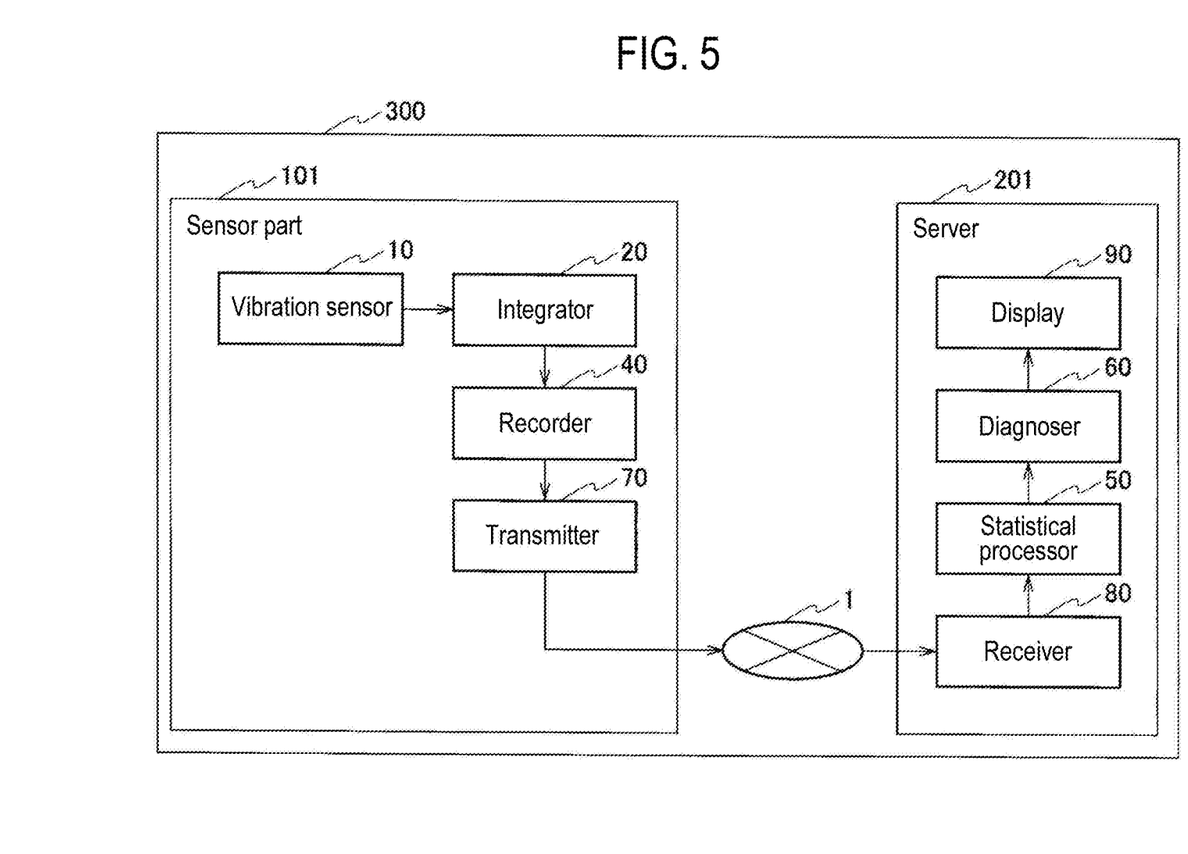
FIG. 5 is a block diagram illustrating a functional configuration example of a vibration sensor system equipped with a self-diagnosis function according to a third embodiment of the present disclosure.

FIG. 5 is a block diagram illustrating a functional configuration example of a vibration sensor system according to a third embodiment of the present disclosure. A vibration sensor system 300 illustrated in FIG. 5 is different from the aforementioned embodiments in that the vibration sensor system 300 is configured by a sensor part 101, a server 201, and a network 1.

The sensor part 101 includes a vibration sensor 10, an integrator 20, a recorder 40, and a transmitter 70. The vibration sensor 10, the integrator 20, and the recorder 40 are similar to those of the second embodiment.

The sensor part 101 may be configured as, for example, a one-chip microcomputer. In that case, the transmitter 70 is configured as an input and output interface of the one-chip microcomputer.

The network 1 is not limited in scale from a small network connected with a local area network (LAN) cable to the Internet. The integrated value of the vibration data recorded in the recorder 40 of the sensor part 101 is transmitted from the transmitter 70 to the server 201 via the network 1.

The server 201 is configured as, for example, a personal computer. A receiver 80 is configured as an input port of the personal computer. A statistical processor 50 and a diagnoser 60 are similar to those of the second embodiment. Further, a display 90 is, for example, a display device constituting the personal computer.

Figure 6:
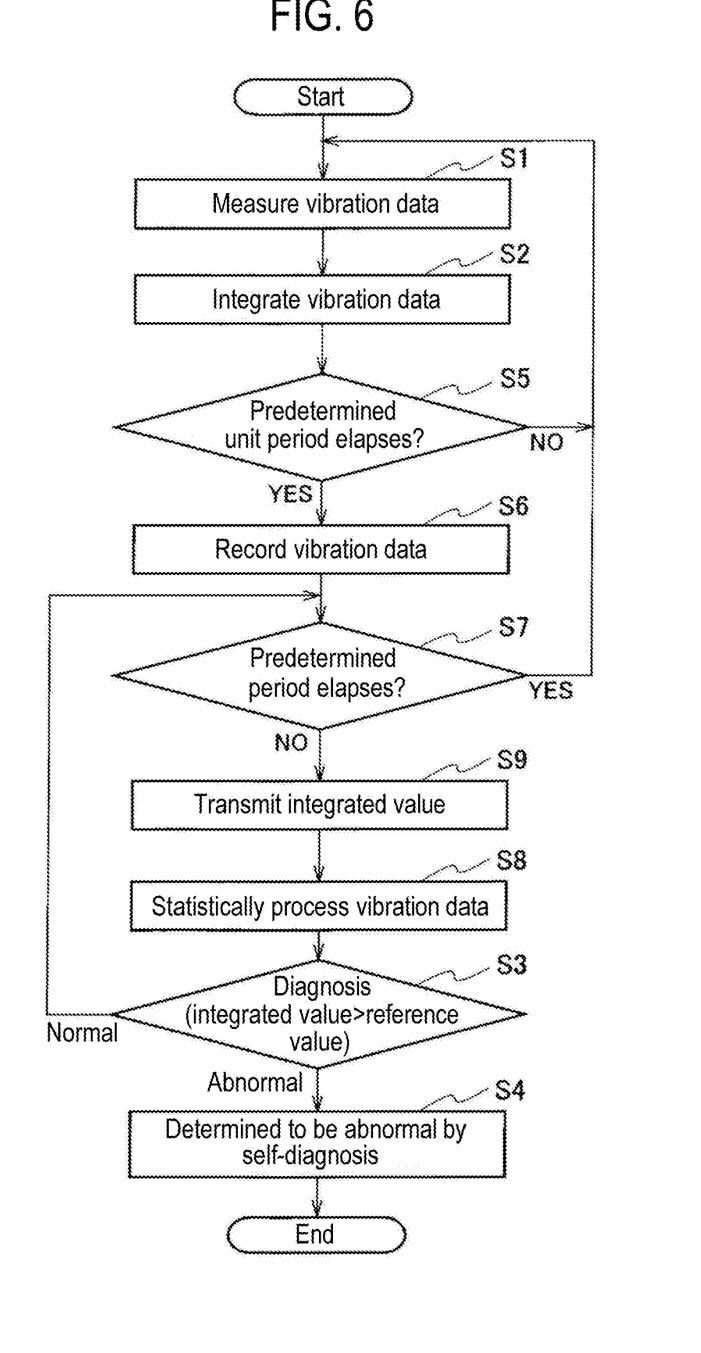
FIG. 6 is a flowchart illustrating an operation procedure of the vibration sensor system equipped with a self-diagnosis function according to the third embodiment.

FIG. 6 is a flowchart illustrating an operation procedure of the vibration sensor system 300. An operation of the vibration sensor system 300 will be described with reference to FIGS. 5 and 6.

Steps up to step S1 of measuring the vibration data, step S2 of integrating the vibration data, and step S5 of recording the integrated value of the vibration data for a predetermined period are similar to those of the vibration sensor system 200. The present embodiment is different from the second embodiment in that the transmitter 70 transmits the integrated value recorded in the recorder 40 to the server 201 via the network 1.

The server 201 statistically processes the integrated value received from the sensor part 101. Further, in FIG. 6, notation of a receiving step of receiving the integrated value is omitted.

As described above, the vibration sensor system 300 according to the present embodiment is configured by: the sensor part 101 including the vibration sensor 10, the integrator 20, the recorder 40, and the transmitter 70 configured to transmit the integrated value recorded in the recorder 40 to the server 201 via the network 1; and the server 201 including the receiver 80 configured to receive the integrated value from the sensor part 101, the statistical processor 50, the diagnoser 60, and the display 90.

Further, the vibration sensor system 300 provides a self-diagnosis method for the vibration sensor 10. The self-diagnosis method includes step S9 of transmitting the integrated value recorded at step S6 of recording for the predetermined period to the server 201 via the network 1. Step S8 of performing statistical processing and step S3 of performing diagnosis are executed by the server 201.

According to the present embodiment, the sensor part 101 may be managed by the server 201 arranged at a different location via the network 1. Although only one sensor part 101 is illustrated in FIG. 5, the number of sensor parts 101 may be easily increased. Each of the plurality of vibration sensors may be identified by assigning an identifier.

The statistical processor 50 processes integrated values transmitted from the plurality of vibration sensors by mapping the values with the identifiers. By doing so, it is possible to centrally manage the plurality of vibration sensors 10 by one server. At the same time, it is possible to monitor whether or not each vibration sensor 10 is abnormal.

Specific Example

Figure 7:
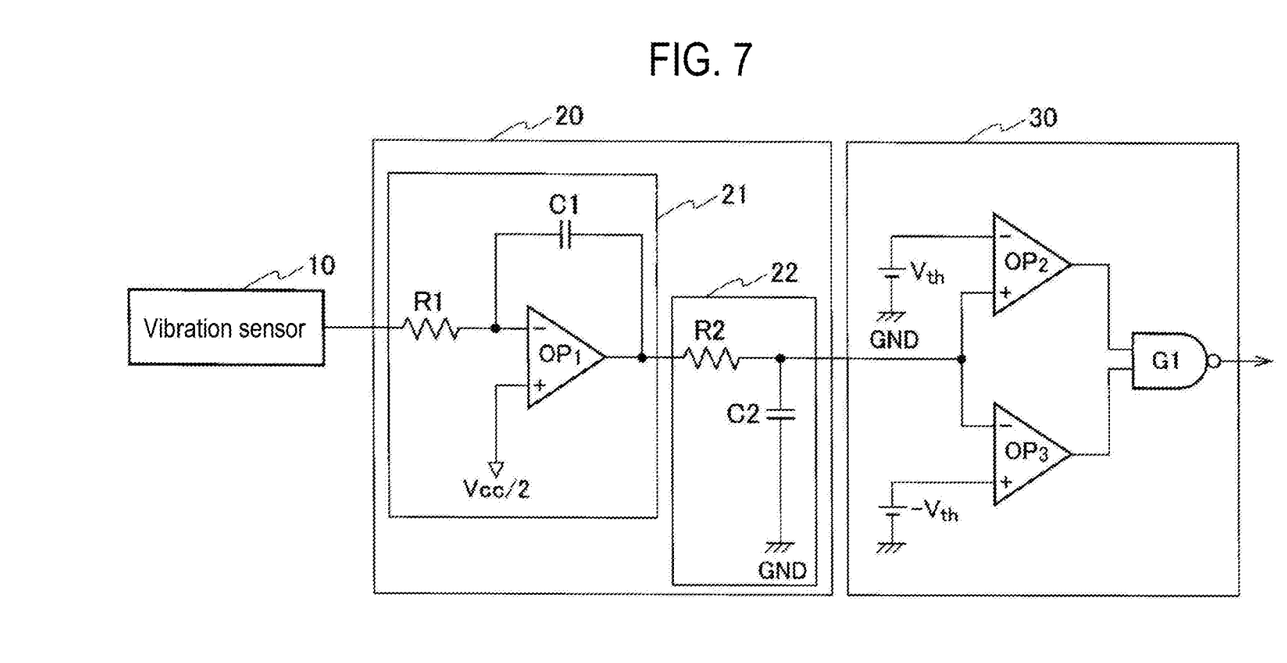
FIG. 7 is a functional configuration diagram illustrating a specific example of the vibration sensor system equipped with a self-diagnosis function according to the first embodiment.

FIG. 7 is a functional configuration diagram illustrating a specific example of the vibration sensor system 100 (see FIG. 1). The integrator 20 shows an example configured by a general integration circuit. Further, the diagnoser 30 shows an example configured to diagnose a failure using two reference voltages.

The integrator 20 is configured by a general integration circuit 21 and a smoothing circuit 22. The integration circuit 21 is configured by an integration resistor R1, a differential amplifier $OP_1$, and an integration capacitor C1. The smoothing circuit 22 is configured by a smoothing capacitor C2 and a smoothing resistor R2. An output of the differential amplifier $OP_1$ is connected to the smoothing capacitor C2 via the smoothing resistor R2.

The diagnoser 30 is configured by two reference voltages Vth and −Vth, two differential amplifiers $OP_2$ and $OP_3$, and a NAND gate G1. The NAND gate G1 outputs a diagnosis result.

A non-inverting input terminal (+) of the operational amplifier $OP_2$ is connected to the smoothing capacitor C2, and an inverting input terminal (−) thereof is connected to one reference voltage Vth. An inverting input terminal (−) of the operational amplifier $OP_3$ is connected to the smoothing capacitor C2, and a non-inverting input terminal (+) thereof is connected to the other reference voltage −Vth. An output of the operational amplifier $OP_2$ is connected to one input of the NAND gate G1, and an output of the operational amplifier $OP_3$ is connected to the other input of the NAND gate G1.

The reference voltages Vth and −Vth indicate a range in which a voltage at a zero point of the vibration sensor 10 is normal. The diagnoser 30 diagnoses the vibration sensor 10 as normal if the voltage at the zero point of the vibration sensor 10 is within the range of −Vth to Vth.

Figure 8:
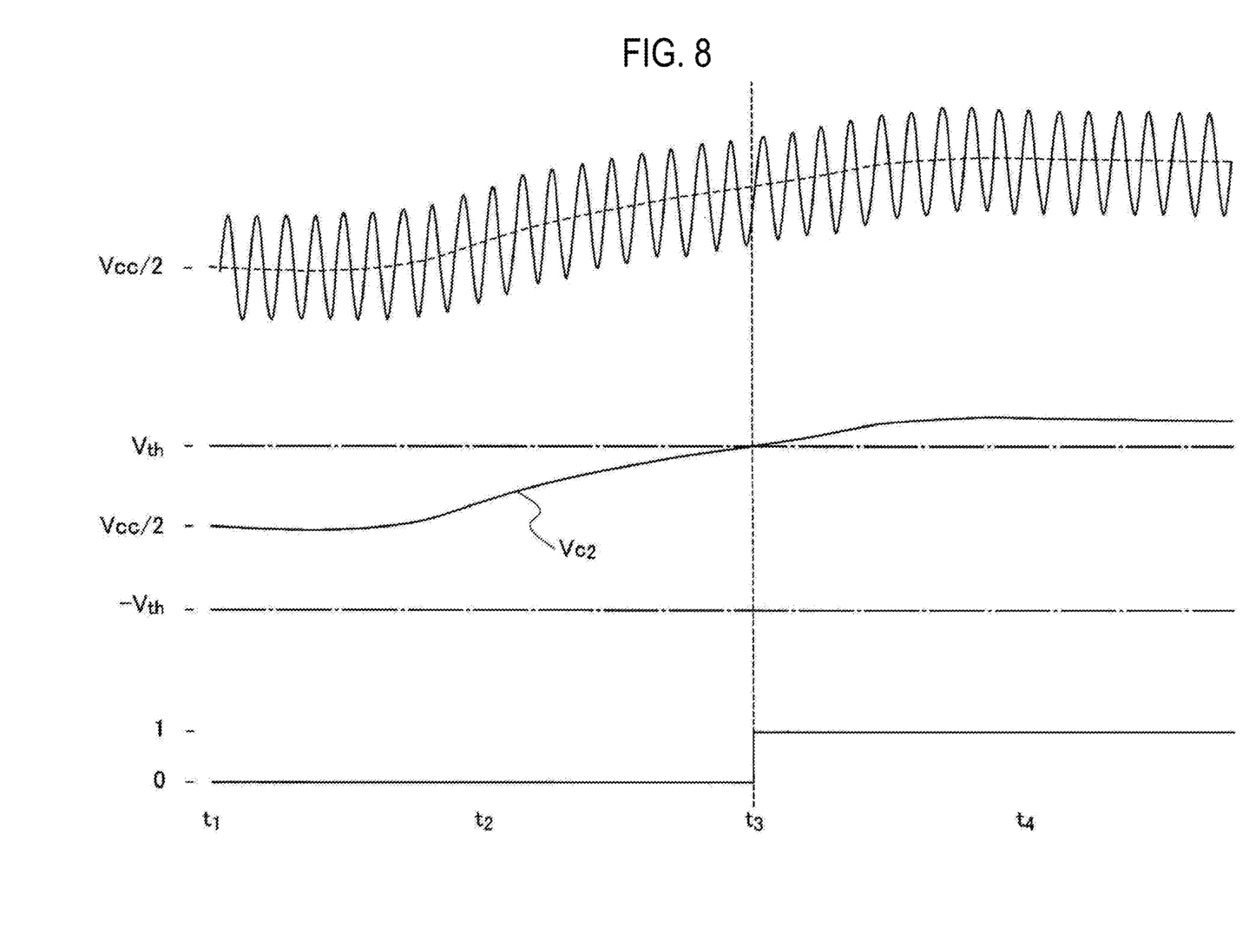
FIG. 8 is a diagram schematically illustrating waveform examples of respective components of the vibration sensor system equipped with a self-diagnosis function illustrated in FIG. 7.

FIG. 8 is a diagram schematically illustrating waveform examples of the respective components of the specific example illustrated in FIG. 7. FIG. 8 illustrates an example when the zero point of the vibration sensor 10 is offset in the positive direction to become abnormal. Waveform examples of the output of the vibration sensor 10, a voltage $V_{C2}$ of the smoothing capacitor C2, and an output of the NAND gate G1 are shown sequentially from the top. The horizontal direction of FIG. 8 is time. Further, in FIG. 8, the influence of gravitational acceleration is ignored. Also, notation of the output of the differential amplifier $OP_1$ is omitted.

As illustrated in FIG. 8, the output of the vibration sensor 10 in the vicinity of time t1 has a waveform with positive and negative amplitudes around a mid-potential Vcc/2, indicating that the vibration sensor 10 is normal. Thereafter, in this example, the vibration sensor 10 becomes abnormal for some reason, and the zero point starts to be offset in the positive direction. The zero point becomes a constant voltage after time t3.

The middle stage of FIG. 8 indicates the voltage $V_{C2}$ of the smoothing capacitor C2 when the zero point of the vibration sensor 10 changes as described above. As illustrated in FIG. 8, the voltage $V_{C2}$ becomes higher than the reference voltage Vth at time t3.

When the voltage $V_{C2}$ of the smoothing capacitor C2 becomes higher than the reference voltage Vth, the output of the operational amplifier $OP_2$ becomes "0" (low voltage: GND) and the output of the operational amplifier $OP_3$ becomes "1" (high voltage: Vcc). Therefore, the NAND gate G1 between time t1 and time t2 outputs "1" indicating that the vibration sensor 10 is abnormal.

When the offset voltage of the vibration sensor 10 changes in the opposite direction and a failure occurs, the voltage $V_{C2}$ of the smoothing capacitor C2 becomes lower than the reference voltage –Vth. Then, the output of the operational amplifier $OP_2$ becomes "1" and the output of the operational amplifier $OP_3$ becomes "0".

As described above, the vibration sensor system 100 configured as illustrated in FIG. 7 can diagnose whether or not the vibration sensor 10 is abnormal. The vibration sensor 10 illustrated in FIG. 7 may be any type of acceleration sensor that can output a voltage.

The vibration sensor system 100 illustrated in FIG. 7 continuously processes the analog amount output by the vibration sensor 10 with the analog circuit. Also, a configuration in which the analog amount output by the vibration sensor 10 is converted into discrete data to detect an abnormality may be considered.

In that case, the analog amount output by the integrator 20 is converted into a digital value by an AD converter. After the conversion into a digital amount, abnormality of the vibration sensor 10 is diagnosed based on the magnitude of the digital amount. The method of diagnosing abnormality is similar to that using the analog amount.

As described above, according to the vibration sensor systems 100, 200, and 300 equipped with a self-diagnosis function according to the embodiments, the self-diagnosis method for an inexpensive vibration sensor, which requires no test signal for self-diagnosis and can use a general-purpose sensor as it is, and the vibration sensor system equipped with a self-diagnosis function can be provided. In short, the embodiments enable monitoring using an inexpensive vibration sensor for consumer use, for which high reliability has not been confirmed, with confidence.

The vibration sensor system 100 equipped with a self-diagnosis function shows a functional configuration example of minimum configuration. Further, the vibration sensor system 200 equipped with a self-diagnosis function can achieve the effect of stabilizing the diagnosis, in addition to the effects that can be achieved in the first embodiment. Moreover, the vibration sensor system 300 equipped with a self-diagnosis function can centrally manage a plurality of vibration sensors 10 with one server, in addition to the effects that can be achieved in the aforementioned embodiments. At the same time, it is possible to monitor whether or not each vibration sensor 10 is abnormal.

According to the present disclosure, the self-diagnosis method for an inexpensive vibration sensor, which requires no test signal for self-diagnosis and can use a general-purpose sensor as it is, and the vibration sensor system equipped with a self-diagnosis function can be provided.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A self-diagnosis method for a vibration sensor attached to a vibrating equipment, the method comprising:
   measuring vibration data of the vibrating equipment by the vibration sensor;
   integrating the vibration data for an integration time;
   recording an integrated value of the vibration data;
   repeating the measuring the vibration data, the integrating the vibration data, and the recording the integrated value each time a predetermined period elapses;
   statistically processing the integrated value to obtain statistical data; and
   diagnosing whether or not the vibration sensor is abnormal by comparing the statistical data with a reference value.

2. The method of claim 1, further comprising transmitting the integrated value recorded in the recording the integrated value to a server via a network,
   wherein the statistically processing the integrated value and the diagnosing whether or not the vibration sensor is abnormal are performed by the server.

3. A vibration sensor system equipped with a self-diagnosis function and attached to a vibrating equipment, the system comprising:
   a vibration sensor configured to measure vibration data of the vibrating equipment;
   an integrator configured to integrate the vibration data for an integration time;
   a recorder configured to record an integrated value of the vibration data;
   a statistical processor configured to statistically process the integrated value to obtain statistical data; and
   a diagnoser configured to diagnose whether or not the vibration sensor is abnormal by comparing the statistical data with a reference value,
   wherein each time a predetermined period elapses, the vibration sensor measures the vibration data, the integrator integrates the vibration data, and the recorder records the integrated value.

4. The vibration sensor system of claim 3, wherein the system is configured by:
   a sensor part including the vibration sensor, the integrator, the recorder, and a transmitter configured to transmit the integrated value recorded in the recorder to a server via a network; and
   the server including the statistical processor and the diagnoser.

* * * * *